Nov. 15, 1932.  L. M. MOTT-SMITH  1,887,739
ELECTROKINETOMETER
Filed May 20, 1929    2 Sheets-Sheet 1
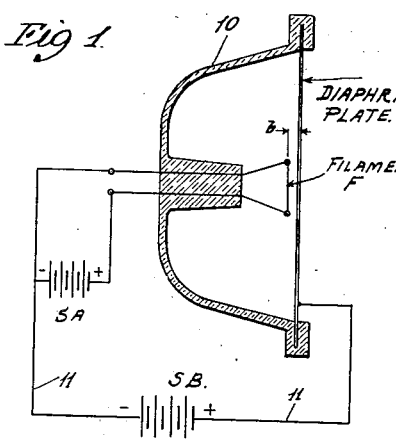
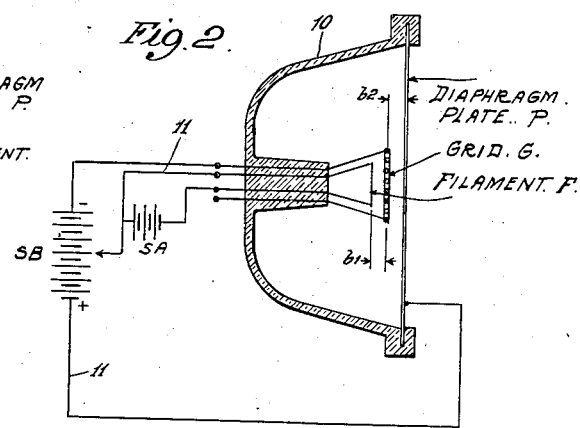
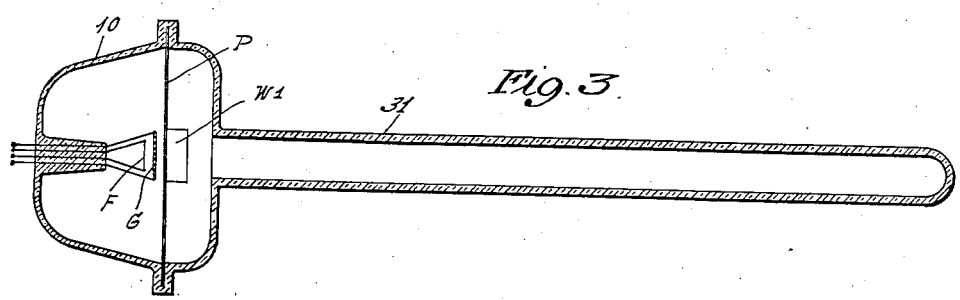
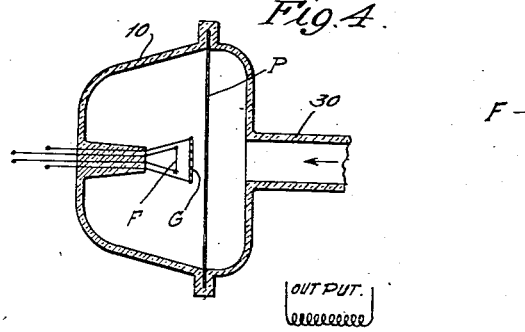
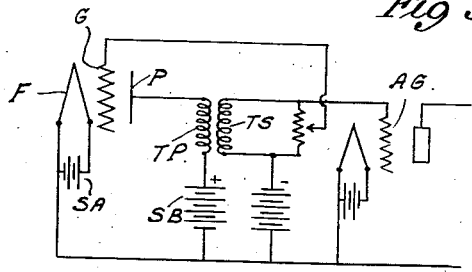
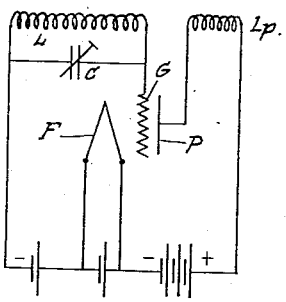
Inventor
Louis. M. Mott-Smith
Attorney.

Nov. 15, 1932.  L. M. MOTT-SMITH  1,887,739
ELECTROKINETOMETER
Filed May 20, 1929   2 Sheets-Sheet 2

Inventor
Louis. M. Mott-Smith.

Attorney.

Patented Nov. 15, 1932

1,887,739

UNITED STATES PATENT OFFICE

LEWIS M. MOTT-SMITH, OF HOUSTON, TEXAS

ELECTROKINETOMETER

Application filed May 20, 1929. Serial No. 364,644.

This invention relates to devices and systems for the transformation of physical movements, forces, pressures, etc., into electric current, or for the measurement of such movements, forces, etc., by means involving an electric current; and one of the general objects of the invention is the production of a device or system having faithfulness of response and also capable of great sensitivity.

One common use to which my invention is applicable is that of a microphone; a microphone being a device for transforming changing pressures of the auditory type into a corresponding pulsating electric current. My invention, as will be hereinafter pointed out, is particularly useful as a microphone; but it is not at all limited to microphonic use, being applicable to a large variety of purposes where it is desirable to transform or measure a physical movement, however caused, into or by an electric current, or wherever it is desired to similarly measure or transform pressures or forces which cause movement. Thus, although a substantial portion of the following detailed description deals with the specific use of my system and devices as a microphone, it will be understood, from what I say here and from what follows, that the system and devices are not at all limited, in the broader aspects of my invention, specifically to microphonic purposes. It is with the foregoing in view that I have chosen to name my device or system an electro-kinetometer—designating a means for electrically measuring or indicating movements, forces, pressures, etc.

I have discovered that if any one or more of the elements of a two- or three-element thermionic tube be moved relative to the remaining elements, a definite and predictable change in current flow follows. The ratio of such change to the amount of movement—the sensitivity ratio of such a system—depends, of course, upon various controlling factors—for instance, upon which element or elements are given relative movement, and also upon various selectable constants of the tube structure. And I have ascertained that, within easily attainable physical and mechanical limitations, the various constants can be so selected that, when the tube and system are operated well within the range of faithful or linear response, the sensitivity ratio is much higher than the sensitivity ratio of any microphonic or similar device of which I am aware. For instance, the sensitivity ratio may be made to be as much as ten times the corresponding ratio of the condenser type microphone now in use; and similar is the comparison with contact microphones. My device also has the advantage that it gives a faithfulness of response at least as accurate as, if not better than, that of the condenser microphone, and far more accurate than that of the contact microphone.

Broadly speaking, my invention may utilize either a two-element thermionic combination. or one of three or even more elements; and in any case any one of the elements may be the one which moves. For instance, in the three element case the movement may be that of the plate relative to the grid and filament, which is electrically equivalent to corresponding relative movement of the grid and filament together with relation to the plate; or the moving element may be the filament or the grid, which movements are, respectively, electrically equivalent in each case to movements of the remaining two elements relative to the one specified. It therefore only needs, in a two element case, consideration of actual movement of one element, say the plate, and, in the three element case, consideration of movement of the plate, the grid, and the filament, to cover the electrical effects of various relative movements. These are discussed hereinafter. It is also pointed out that the three element combination is capable of greater sensitivity, and furthermore that certain other characteristics of the three-element combination, such as regeneration and oscillation, may be utilized in my system for the purpose of amplification or modulation of an oscillating carrier current.

Descriptions of typical forms of apparatus and system follow; but it will be understood that these descriptions are intended merely to be indicative of the invention, its range and scope, and not a limitation thereon except as may be so specifically stated in certain of the appended claims. For the purpose of description I refer to the accompanying drawings of which, Figure 1 is a diagrammatic section illustrating my invention as applied to a two-element thermionic combination.

Fig. 2 is a diagrammatic section showing the system utilizing a three-element thermionic combination.

Fig. 3 is a diagrammatic section showing an adaptation of the device of Fig. 2 for the measurement of movements and forces such as accelerations.

Fig. 4 is a similar diagram showing an adaptation for the measurement of applied processes.

Fig. 5 is a circuit diagram showing the thermionic combination of Fig. 2 connected into an amplifying system.

Fig. 5a is a circuit showing the thermionic combination of Fig. 2 in an oscillation circuit.

Figs. 1 and 2 showing the plate as the relatively movable part.

Figure 7:
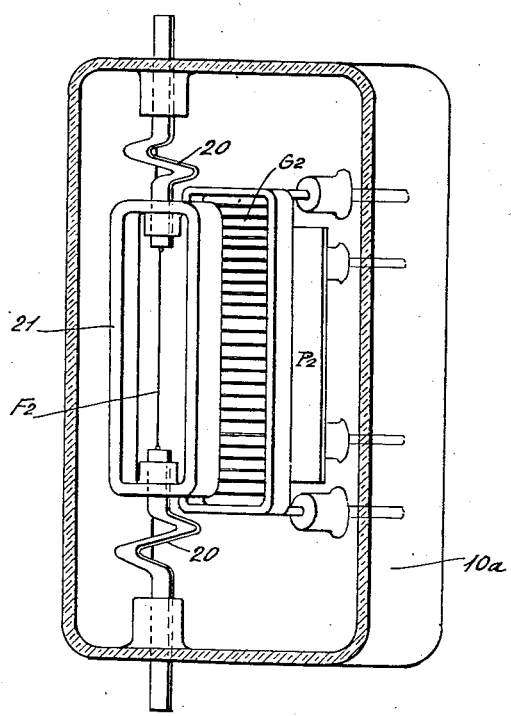
Fig. 7 is a diagrammatic view showing a three element combination with the filament as the relatively movable part.

The fundamental principle of my system and device is that, in a two or more element thermionic device, the space current through the tube can be made to depend upon the relative positions of the elements, and varies with each of these relative positions. This is true no matter what relative changes of positions are made, but it is best at the outset to consider a simple thermionic combination consisting of a thermionic emitter (filament) and a plain collecting plate (the plate); and, for example, to consider the plate as what I shall call the movable element, although the movement is purely relative and it makes no electrical difference whether the plate be considered movable or the filament be so considered.

Thus in Fig. 1 I have diagrammatically illustrated a two-element thermionic kinetometer in which the plate P is in the form of a diaphragm forming one wall of an enclosure, the remainder of which may be formed as shown at 10 and of any suitable material, say of glass. The filament F is arranged close to the plate and in a plane parallel with it. The whole arrangement is such that transverse movements of the diaphragm plate P cause variations in the distance $b$ between the plate and filament. The envelope being exhausted, the diaphragm plate is under an exterior pressure equal to atmosphere. As will be pointed out later, this diaphragm plate may be so selected as to material and dimensions that atmospheric pressure gives it substantially the desired tension for microphonic work or for the measurement, indication, or electrical transformation, of movements, forces or pressures applied to the diaphragm in other manners. All these things are explained more particularly in connection with the discussion of a three-element kinetometer hereinafter. It will suffice, as far as a two-element device is concerned, to consider shortly its characteristics of operation specifically as a microphone, or, more fundamentally speaking, as a device for measuring the movement of diaphragm plate P by an electric current, or transforming that movement into electric current variations.

If the kinetometer of Fig. 1 be included in an electrical circuit such as indicated in that figure, the filament being heated by current from the source SA and being potentiated from the source SB, a space current will flow between the filament and plate and through the circuit 11, the current flow depending, among other things, upon distance $b$. If that distance $b$ be varied, the current flow will correspondingly vary.

Without going into the mathematics of operation fully, it will be sufficient here to note the following considerations, which are more or less controlling. Let A represent the area of the filament in square centimeters; $b$ the distance between the filament and plate; E the potential difference between the filament and plate; and I the current flow. It is known that, considering A and $b$ as fixed, there is a definite relationship between I and E.

(1) $$I = 2.33 \times 10^{-6} \times \frac{AE^{\frac{3}{2}}}{b^2}$$

If $b$ varies, there is definite relationship between $b$ and both E and I. It is more of interest, however, to determine the relationship between $b$ and E, as changes and variations in potential within the tube are fixed quantities, uninfluenced by exterior resistance as is the current flow. It is consequently of greatest interest to determine the sensitivity ratio, which will be called $v$. and which is equal to the change in E divided by the change in $b$—that is $$v = \frac{\Delta E}{\Delta b}$$

Again, without going into mathematical details, it finally results that:

(2) $$v = -\frac{4E}{3b} \text{ volts/cm.}$$

and (3) $$R = 2.88 \times 10^5 \times \frac{b^2}{AE^{\frac{1}{2}}} \text{ ohms.}$$

By the use of these two formulæ, the action of the two-element thermionic tube is completely predicted and the various constants are so chosen as to give the results desired in any particular case. For instance, suppose the maximum plate displacement which is desired to be measured or electrically transformed is .01 cm. (the normal maximum diaphragm displacement when the device is used as a microphone is only of the order of $10^{-6}$ cm.) A convenient filament area may be taken at ½ cm². From a consideration of Equation (2) it will be seen immediately that $v$ varies inversely as $b$; and likewise from Equation (3) we see that R varies directly as $b^2$. It being desirable to make R small and $v$ large, the distance $b$ should be made as small as conveniently possible. A reasonable separation of filament and plate, and one that is easily attained in practice, may be taken as 0.1 cm. The remaining E factor should obviously be made as large as possible, limited only by operation of the tube on that part of the E—I curve where I varies with E. This limitation is well known and needs no further explanation. The maximum permissible value of E can be obtained by using data on the saturation current per cm². for the particular type of filament adopted; and for a type of filament now in common use, known as the "Western Electric" type, the saturation current is known to be about ½ amp. per cm². for normal operating temperatures. It is safe to operate at about one-half the saturation current.

Having thus selected the several constants, the value of E is then found to be about 105 volts, from consideration of the known relationship between I and E, hereinabove first referred to (Equation 1). And having thus, or experimentally, determined E, it is then a simple matter, using Equations (2) and (3), to determine $v$ as about 1400 volts per centimeter, and to determine R as being about 538 ohms.

It is of course possible to determine and select the characteristics of the tube by experimental methods, and as well possible to determine the tube performance experimentally. But the foregoing and following considerations will give to those skilled in the art an understanding of the performance and an understanding of the factors on which that performance depends.

After having ascertained the foregoing constants it is then possible to calculate the performance of the device in any desired circuit. For instance, in the illustration given, and remembering that $$v = \frac{\Delta E}{\Delta b},$$

for a displacement of the moving element of 0.001 cm. the variation in E becomes 1.4 volts, and the variation in current flow becomes that variation which is produced by changing the potential by 1.4 volts. Thus it is to be noted that a fairly small relative movement produces a relatively large change in E. M. F. And, from this change in E. M. F., the change in current flow is then easily ascertained to be approximately 2.6 milliamperes; neglecting resistance external of the tube. If external resistance is included in the plate-filament circuit the change in current flow is of course correspondingly less.

Passing now to a consideration of the three-element device, such as shown in Fig. 2, there are various possibilities of structure and also of relative movement. A three-element kinetometer may be constructed, as illustrated, with a grid consisting of metallic screen or grating interposed between the filament and plate; although it is possible that the grid can be a plate placed on the side of the filament opposite the usual plate. In a device containing three elements, there are several relative displacements possible. First there is the example of relative motion between the plate on the one hand and the grid and filament on the other hand, which relative motion may be considered simply as motion of the plate with relation to a stationary grid and filament; for motion of the grid and filament with relation to a stationary plate is electrically equivalent to the first mentioned motion. Likewise there is, second, the relative motion between the filament on the one hand and the grid and plate on the other, which will be illustrated merely by assuming movement of the filament. And, thirdly, there is relative motion between the grid on the one hand and the plate and filament on the other, which will be illustrated by movement of the grid. These three simple possible movements are hereinafter considered. There are also other possible movements wherein each of the three elements may move with relation to each other of the remainder, but these need not be specifically considered here in the discussion of the underlying fundamentals of my invention. It is clear that any such last mentioned relative movements include the simpler movements which I here discuss.

I shall consider first the simple, and perhaps most easily physically obtained, case of a movable diaphragm plate, such as in the arrangement shown in Fig. 2. Here, for instance, the diaphragm plate P is arranged in the same manner as described for Fig. 1, the plate P and envelope 10 enclosing the grid G and filament F.

It does not seem possible to compute the value of $v$ (the sensitivity ratio $$\frac{\Delta E}{\Delta b})$$

by the methods used for the two-element device; but that ratio can be obtained by observing that the space current I depends on the electric field at the surface of the filament due to the potential difference between it and the grid and plate. Again, without going into mathematical details, it is to be noted that, using Clerk Maxwell's formulæ involving relationships between the potentials of the grid, filament and plate, the distances between the filament, grid and plate, and the charges induced upon the filament and plate, and further equations expressing known relationships between the radius of the grid wires and their separating distances; and further, the known relationship between F, the electric field at the filament, and $\sigma_1$, the charge density on the filament, I arrive at the following result:

(4) $\quad v(p-gf) = \dfrac{-(V_2-V_1)X - V_2 b_1}{b_1 b_2 + (b_1+b_2)X}$ where the expression on the left side of the equation represents the sensitivity ratio $v$ for movement of the plate relative to the grid and filament, where $V_1$ is the filament potential; $V_2$ the plate potential; $b_1$ the distance between filament and grid; $b_2$ the distance between plate and grid; and X a quantity depending upon the relation between radius of and spacings between the grid wires. The above expression gives the sensitivity ratio thus where $b_1$ is fixed and where $b_2$ is variable.

Likewise where the filament is the relatively moving element, that is $b_2$ is fixed and $b_1$ is variable, then:

(5) $\quad v(f-gp) = \dfrac{[V_1(b_2+X) - V_2 X](b_2+X)}{[b_1 b_2 + X(b_1 b_2)]X}$ And likewise where the grid is a relatively moving element, and both $b_1$ and $b_2$ vary with the relationship expressed by $\Delta b_1 = \Delta b_2$, then:

(6) $\quad v(g-pf) = \dfrac{V_1 b_2(b_2+2X) - V_2 X(b_2-b_1)}{[b_1 b_2 + X(b_1+b_2)]X}$ Considering the three-element device as an ordinary vacuum tube amplifier, the resistance R depends mainly on the valuation of $V_1$ and $V_2$, the area of the filament, the size of the plate and the value of its characteristic constants. Knowing these characteristic constants and after having chosen suitable values for the other constants, the value of I can then be estimated by comparing with known values of R for radio tubes, or can be determined experimentally.

In order to illustrate the use of the formulæ above given and to illustrate the design of the tube under the controlling factors necessary to consider, I shall assume first a kinetometer constructed in the manner shown in Fig. 2. Here, as in Fig. 1, a deflection of the diaphragm plate P will produce a change in current flowing in circuit 11. Assuming for instance that the device is being used as a microphone, or for any other purpose where it is desired to measure or electrically transform variations in pressure applied to, or movements of, the diaphragm, it is desirable to use a very thin diaphragm stretched under considerable tension. A steel diaphragm about 0.005 cm. thick, 5 cm. in diameter and stretched to a tension of about $6 \times 10^7$ dynes/cm. is suitable. It is interesting to note that in such an arrangement as in Fig. 2, where there is substantially no pressure on one side of the diaphragm and atmospheric pressure on the other, the atmospheric pressure produces a large part and possibly all of the necessary tension in the diaphragm.

In choosing the best values for the size of the filament, the distance $b_1$ and $b_2$, the operating potentials $V_1$ and $V_2$, and the characteristics of the grid, Equation (4) is utilized. It is wished to make $v$, (the sensitivity ratio) as large as possible, and R as small as possible. From Equation (4) it is noted that $v$ varies inversely as $b_2$. On the other hand R varies directly as $b_2$. Thus on both these considerations it is desirable to make $b_2$ as small as practically realizable in construction. For instance, a separation between the grid and plate of 0.02 cm. is chosen. In this microphone case and in the case of any utilization where the diaphragm is displaced by similarly small distances, the chosen separation of plate and grid is sufficient, as such a diaphragm has a normal sound vibration displacement of only about $10-6$ cm.

Also from Equation (4) it is seen that $V_2$ should be as large as possible if $V_1$ is greater than $V_2$ (which of course is the case in a thermionic tube), and if $b_1$ is chosen not to be too small, as will be hereinafter mentioned. $V_2$ is the potential difference between the grid and plate (it being assumed in all these considerations that the grid potential is zero, because it is the differences in potential between the plate and grid, and the filament and grid, that are the controlling factors of operation). $V_2$ can be made as high as 1000 volts or more in practice, but as an illustration a value of 300 volts is chosen as convenient.

The value of $V_1$ is better chosen without regard to its effect on the sensitivity ratio $v$. $V_1$ is simply the value of the "grid bias" when the tube is regarded as an ordinary amplifier. Its value is chosen, just as in an ordinary tube, so that the tube is operating with a reasonable value of space current and at a suitable point on the characteristic E—I curve. A suitable value as here chosen is from 10 to 50 volts, with the polarity such that the grid is negative with respect to the filament. Thus $V_1$ in this case is chosen as from 10 to 50 volts positive.

Concerning $b_1$, it may be noted in Equation (4) that the value of $v$ is practically independent of its value. The value of R, the resistance of the tube, increases with increasing $b_1$, and a convenient value, such as used in an ordinary tube, is considered suitable. Hence I take $b_1$ to be 0.1 cm.

In Equation (4) the quantity X is a quantity that dependes upon relationships between the radius of the grid wires and the spaces between the grid wires. In order to make $v$ large it is necessary that said quantity X be as small as possible. However, the quantity X, depending as it does upon the relationship of the grid wire radius and spacing, is also a controlling factor in the determination of R, the resistance of the tube; and the relationships are such that a small value of X means a large value of R. Hence a compromise must be effected. As an illustration, in order to keep the resistance of the tube to about 4000 ohms it is known, from the characteristics of amplifier tubes with the usual filament having an area of about 0.3 cm²., the quantity X must be kept at about 0.005. Assuming that quantity for X, and bearing in mind that the size of the grid wires cannot be too large in proportion to the spacing (the wire radius should be substantially not greater than one-tenth the spacing), it is found for our present design that the grid wire spacing should be about .06 cm. and the grid wire radius about .006. cm.

Assuming now these various constants, it is possible to compute the sensitivity $v$ by simple substitution in Formula (4), the result being that the sensitivity ratio $v$ is found to be about 11,200. Thus in the three-element device the sensitivity ratio is about ten times as great as in the two-element tube. The three-element kinetometer has a higher resistance than the two-element device, and this may be a disadvantage in some cases, but it is not a disadvantage where the tube is connected into an amplifying system.

The three-element device as described above makes a very satisfactory microphone, and, for the same reasons that it makes a satisfactory microphone, it is also very satisfactory in the delicate detection, measurement and electrical transformation of other movements, pressures or forces. For instance, it is interesting to compare performance with that of the latest type of condenser microphone. Since both microphones are used to operate a vacuum tube amplifier, it is fair to connect each to the grid of the first amplifying tube in the most advantageous manner possible, and then to compare their relative sensitiveness. In the case of the condenser microphone, direct connection to the amplifier grid is best. For the microphone here described, since its impedance is lower than that of the amplifier input, it is best and desirable to use a step-up transformer. Choosing the impedance of the transformer primary to be equal to that of the kinetometer device, which is R, the impedance of the secondary is chosen to be as high as convenient. It is customary to make the secondary inductance about 800 henries. In order to make the impedance of the primary 4000 ohms at 60 cycles, the impedance of the primary becomes 11 henries; and the turn ratio, and the voltage gain, works out to be about 8.5.

Using these chosen constants, and observing that the impedance in the circuit is divided equally between the kinetometer and the circuit exterior of the tube, and also that such a diaphragm as here chosen gives a deflection of about $10^{-7}$ cm., for unit pressure of 1 dyne per sq. cm.; the potential difference across the transformer primary such as shown at TP in the diagram of Fig. 5, is found to be .00056 volts; and the voltage applied to the amplifier grid AG is thus .0047 for a diaphragm deflection due to unit pressure. In comparison it is known that the condenser microphone gives a voltage change for diaphragm deflection under unit pressure of .00035 on the amplifier grid. The present described device is thus somewhat over ten times as sensitive.

There are other advantages over the carbon button microphone. The device here described shares the advantage of the condenser microphone in the more faithful reproduction of the diaphragm deflections. That is, there is much higher accuracy or linearity of response. And over the condenser microphone the present device has not only the advantage of greater sensitivity, but also the advantage of simpler and easier connection with associated apparatus, due to its lower impedance, and also greater simplicity of construction.

Either the two element or the three element kinetometer may be connected into an amplifying circuit. The three element device is shown so hooked up in Figure 5, the output of the transformer secondary TS being shown as connected into the grid AG of the first amplifier tube. In any case where the displacement of the plate P is of a vibratory nature, a transformer can be used to feed the pulsating current appearing in plate P into any associated apparatus.

Another advantage of the three-element kinetometer for whatever purpose it may be used, arises from the fact that it, of course, retains all the ordinary properties of a three-element vacuum tube. For instance, it can be made to oscillate or regenerate in the manner of an ordinary tube. By making use of regeneration it is possible to increase the sensitiveness tremendously. This possibility of gain may make it advisable to sacrifice some of the normal sensitivity in favor of increased spacing of the elements where great permanency in characteristics is desired. Figure 5 illustrates a circuiting for obtaining regeneration. A portion of the pulsating potential across the secondary of the coupling transformer is impressed or fed back upon the grid G; and if the polarity is chosen so the phase relations are correct, a considerable increase in sensitivity may be obtained due to regeneration.

And such a three-element device may be used as an oscillator in the same manner as ordinary three element tubes are used; and then the motion of the plate acts to modulate the high frequency current being generated. The device therefore becomes one which directly furnishes a modulated high frequency current such as used for radio transmission or for carrier telephony. An indicative circuiting for such purposes is shown in Figure 5a.

This circuit illustrates the three-element kinetometer arranged with an oscillation circuit LC, connected to the grid, which is inductively coupled to the plate through the coil $L_p$. Any form of coupling may be used, however, and the associated oscillation circuit may be designed for any frequency. Operation of the kinetometer will result in modulation of the oscillating current which may be obtained as an output.

Figure 6:
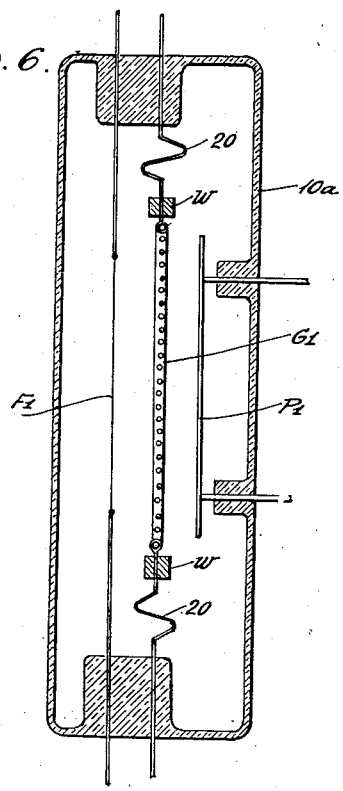
Fig. 6 is a diagrammatic section illustrating a three-element combination wherein the grid is the relatively movable part.

Having explained more or less fully the characteristics and actions of the two and three element devices in which the plate is a movable element, and having indicated the method pursued in choosing the constants of such a structure, it will be unnecessary to go through the same procedure in detail as regards the two cases of moving grid and moving filament. As an indication of the structure involving a moving grid I show in Figure 6 an envelope 10a containing a fixed plate P1 and a fixed filament F1; and a grid G1 which is so mounted that it may move to and from the filament and plate. For instance the grid G1 is mounted on and between resilient flexible supporting springs 20 which allow the grid to move to and from the plate. And the grid may be weighted as at W. The diagram of Figure 6 shows a movable grid to be moved by inertia forces. Where any one of the devices herein explained is to be used in response to inertia forces, it is not necessary that the movable element be movable by applied pressure or by force applicable outside of the enclosing envelope. Figures 1 and 2 illustrate constructions wherein the movable element may be moved by any external force or pressure or motion application; although such a form as Figure 1, or any form in which the movable element can be moved by exterior force application can, of course, also be used to respond to inertia forces, either by weighting the movable element or simply by using the mass of the movable element itself without making any addition.

Figure 7 shows in diagram a similar arrangement but wherein the filament F2 is the movable element, the grid G2 and the plate P2 being the stationary elements. Here the filament F2 is illustrated as being mounted in a carrier or frame 21 which is carried on and between the flexible resilient members 20 in such manner that the filament may move to and from the grid. The frame in this case adds inertia mass to the filament.

Various other arrangements and specific applications of my devices will occur to others. Generally speaking, the devices indicate or measure electrically the movement of the movable element, regardless of what force may be causing that movement, and regardless of the nature of the movement. In some cases it may be desirable merely to indicate or to measure the amount of movement of the movable element without regard to any indication of the character of that movement. In other cases it may be desirable to indicate, transform or electrically reproduce the character of such movement, more or less regardless of its amount, or involving amount of movement only as one factor. Thus, for instance, the devices may be used for the indication or reproduction of movements or forces of a vibratory nature, or of movements or forces that are very slow. On the one hand we have the use of a device as a microphone; on the other hand it will be apparent that a device such as shown in Figures 1 and 2 may as readily be used to indicate such slow force or pressure changes as are measured by a barometer. And in measuring or transforming forces or pressures the device may be actuated by either fluid pressures or by what may be termed, in contradistinction, physical pressures. As an instance of pressure indication Figure 4 shows a movable element P (of the form of Figure 2, for instance) exposed to a fluid pressure which may be conducted to it through a tube 30. As a further indication of inertia actuation Figure 3 shows the movable element P (in the form of Figure 2 for instance) supplied with an additional mass W1 and also arranged so as to be subjected to the inertia forces exercised by a body of fluid in a tube 31 communicating with the face of plate P. The fluid in tube 31 may be either liquid or gaseous and of any desired mass, dependent upon the order of inertia forces desired to be measured or indicated.

I consider my invention as broad and fundamental in its scope and capable of many variations and applications other than those indicated herein. Without going to exhaustive length of detail I have endeavored to indicate here the scope of the invention, its characteristic features of design and action, and its applicabilities; and accordingly I wish it to be understood that the invention is not limited to any of the specific details here described, but rather is only limited in such manner as the appended claims specifically so state.

I claim:

1. A thermionic device embodying a tube including filament and plate elements, one of the elements being movable with relation to the other element, and a fluid enclosing chamber one side of which is formed by the movable element.

2. A thermionic device embodying a tube including filament, grid and plate elements, one of the elements being weighted and being movable with relation to another of the elements, and a fluid enclosing chamber one side of which is formed by the movable element.

3. A thermionic device embodying a tube including filament, grid, and plate elements, one of the elements being movable with respect to the other two elements, the spacing between the filament and grid elements being substantially .1 cm. or greater, and the spacing between the grid and plate elements being of the order of .03 cm.

4. A thermionic device embodying a tube including filament, grid, and plate elements, the plate element being movable with respect to the filament and grid elements, the spacing between the filament and grid elements being substantially .1 cm. or greater, and the spacing between the grid and plate elements being of the order of .03 cm.

In witness that I claim the foregoing I have hereunto subscribed my name this 7th day of May, 1929.

LEWIS M. MOTT-SMITH.